US006989047B2

(12) United States Patent
Wyschofsky et al.

(10) Patent No.: US 6,989,047 B2
(45) Date of Patent: Jan. 24, 2006

(54) METHOD FOR THE ABSORPTIVE OUTWARD TRANSFER OF AMMONIA AND METHANE OUT OF SYNTHESIS GAS

(75) Inventors: Michael Wyschofsky, Dortmund (DE); Vincent Liu, Bochum (DE)

(73) Assignee: Uhde GmbH, Dortmund (DE)

( * ) Notice: Subject to any disclaimer, the term of this patent is extended or adjusted under 35 U.S.C. 154(b) by 101 days.

(21) Appl. No.: 10/473,456

(22) PCT Filed: Apr. 5, 2002

(86) PCT No.: PCT/EP02/03812

§ 371 (c)(1), (2), (4) Date: Mar. 11, 2004

(87) PCT Pub. No.: WO02/081060

PCT Pub. Date: Oct. 17, 2002

(65) Prior Publication Data

US 2004/0139856 A1 Jul. 22, 2004

(30) Foreign Application Priority Data

Apr. 5, 2001 (DE) ................................ 101 16 958

(51) Int. Cl.
*B01D 52/14* (2006.01)
*C01C 1/04* (2006.01)

(52) U.S. Cl. ............................ 95/203; 95/232; 95/237; 423/352

(58) Field of Classification Search .................. 95/149, 95/187, 199, 203, 232, 230, 237; 585/833, 585/866; 423/352, 359
See application file for complete search history.

(56) References Cited

U.S. PATENT DOCUMENTS

| | | | | |
|---|---|---|---|---|
| 3,344,585 A | * | 10/1967 | Hollowell | 95/199 |
| 3,805,536 A | * | 4/1974 | Lynn | 62/634 |
| 4,119,412 A | * | 10/1978 | Advani | 95/232 |
| 5,230,877 A | * | 7/1993 | Eimer et al. | 423/359 |
| 6,139,605 A | * | 10/2000 | Carnell et al. | 95/164 |

FOREIGN PATENT DOCUMENTS

| | | |
|---|---|---|
| DE | OS 1 924 892 | 11/1969 |
| DE | 135 372 A | 5/1979 |
| EP | 0 751 815 B | 1/1997 |
| EP | 0 770 420 A | 5/1997 |
| WO | WO 90/08736 | 8/1990 |

* cited by examiner

*Primary Examiner*—Frank M. Lawrence
(74) *Attorney, Agent, or Firm*—Marshall & Melhorn, LLC

(57) ABSTRACT

The invention relates to a process for the absorptive separation of $NH_3$ and $CH_4$ from a gas under high pressure, which at least contains $NH_3$, $H_2$, $N_2$ and $CH_4$, using a high-boiling, physically acting and regenerable solvent which contains homologues of alkylene glycol-alkyl-ether and which also may contain water, the absorbed components $NH_3$, $H_2$, $N_2$ and $CH_4$ being separated from the laden solvent in at least two further process steps at different pressure rates, thereby withdrawing at least one $NH_3$-rich and at least one $CH_4$-rich gas fraction from the solvent. This process is particularly suitable to be incorporated as unit in an ammonia production plant.

18 Claims, 3 Drawing Sheets

METHOD FOR THE ABSORPTIVE OUTWARD TRANSFER OF AMMONIA AND METHANE OUT OF SYNTHESIS GAS

This application is a 371 of International Application No. PCT/EP02/03812, filed on Apr. 5, 2002.

BACKGROUND OF THE INVENTION

The invention relates to a process for the absorptive separation of $NH_3$ and $CH_4$ from a gas under high pressure (>50 bar abs.), which at least contains $NH_3$, $H_2$, $N_2$ and $CH_4$, hereinafter referred to as synthesis gas. $NH_3$-rich synthesis gas is chiefly available in processes for generating $NH_3$ from such synthesis gas, the conversion rate of said processes being really low because of the temperatures, pressures and catalysts that are applied, and the $NH_3$ produced from synthesis gas having to be removed from a non-reacted gas stream. It is pointed out, however, that the invention is by no means restricted to this specific application.

Conventional plants for generating $NH_3$ from synthesis gas are designed as loop systems operating at high pressure. Said configuration provides for the compression of the synthesis gas that contains $H_2$, $N_2$ and inert gas fractions, inter alia $CH_4$, to a high pressure in the first step and then for the feed of the compressed gas to a reactor system in which part of the synthesis gas, i.e. 10 to 20%, is converted to $NH_3$. The gas mixture obtained downstream of the reactor system is cooled with the aid of water such that as large a portion as possible of the $NH_3$ formed condenses and can be withdrawn as liquid. In order to provide for the condensation of a further $NH_3$ portion of the non-reacted gas mixture, additional cooling to much lower temperatures is required, hence an expensive refrigeration cycle. As it is indispensable to reduce the processing costs to an economic level, $NH_3$ is separated only up to a residual content of approx. 4 molar % in the non-reacted gas stream.

In the case of a product concentration of 20 molar % at a synthesis pressure of 200 bar, for example, the dew point of $NH_3$ is approx. 57° C. When providing a cooling by means of water, for instance, to 35° C., it is possible to reduce the $NH_3$ content in the gas to 11.2 molar %, which permits a yield of 59% of the condensable product quantity. As the recycle gas fed to the reactor should have as low an $NH_3$ concentration as possible, in this particular case 3.8 molar-%, it is common practice to install a low-temperature cycle downstream of the water cooling system so that further product amounts can be condensed at even lower temperatures (e.g. cooling to −10° C. to 0° C.).

Upon $NH_3$ separation a purge stream is permanently withdrawn from the synthesis loop unit which prevents that the loop is enriched with gas fractions that are inert vis-à-vis the $NH_3$-producing reaction as, for example, $CH_4$ entrained by fresh synthesis gas. It is also necessary to recover residual $NH_3$ and valuable fractions of the synthesis gas from the purge stream withdrawn, said fractions being re-compressed and then recycled to the synthesis loop. The loop is closed downstream of the purge stream withdrawal section by providing a circulator that compensates the pressure drop and by balancing the synthesis gas loss in the reaction through the admixture of fresh synthesis gas to the recycle synthesis gas.

But this system has the disadvantage that, for example, the $NH_3$ separation at 180 bar synthesis pressure can be efficiently carried out down to a residual content of about 4 molar % only. In the case of a reaction system arranged downstream within a synthesis loop or fresh-gas reaction system of the $NH_3$ separation unit, the said residual content will essentially equal the $NH_3$ inlet concentration; the dilution caused by the intermediate admixture of fresh synthesis gas would change the $NH_3$ inlet concentration to a minor extent only. Compared to synthesis gas that has no $NH_3$ content, the $NH_3$ inlet concentration of about 4 molar % would only permit a yield of about ⅘ of the $NH_3$ amount recoverable per loop cycle.

Another disadvantage is that an expensive method is required to separate further $NH_3$ from the purge stream withdrawn if its exploitation is not abandoned. The higher the purge stream rate, the larger the $NH_3$ amount to be separated. But when the said rate is kept low, the inerts such as $CH_4$ are enriched in the loop synthesis gas and their partial pressure reduces the yield obtained in the reaction system and the portion of $NH_3$ that can be recovered with the aid of cooling water.

The criteria described in the previous paragraphs also apply to $NH_3$ production plants that are not designed as loop systems because the $NH_3$ portion not converted to synthesis gas will be exploited, for example, by downstream synthesis units. This also involves the need to separate as large an $NH_3$ portion as possible from the synthesis gas downstream of the reaction system and to keep the inerts concentration low.

Hence, there has been a keen interest for years on the part of the chemicals industries to exploit by economic methods even small residual amounts of $NH_3$ contained in the synthesis gas. A series of tests were carried out to remove $NH_3$ by scrubbing; in most cases the solvent was an aqueous solution. This, however, involved on the one hand the problem to remove the dissolved $NH_3$ from said solution, on the other hand the need to avoid volatilisation of fractions of the aqueous solution during scrubbing, said fractions entering the synthesis gas and thus causing technical problems in the downstream equipment, for example, poisoning of the catalyst. The said problems aroused the technological prejudice that there is not a safe and economic method to separate the $NH_3$ from the synthesis gas by scrubbing. Moreover, there had been some interest in a selective removal of inerts, such as $CH_4$, from the synthesis loop in order to reduce the necessary purge stream to a minimum.

It has also been described, for example, in German patent DE OS 1 924 892, that $NH_3$ is absorbed from the gas mixture leaving the conversion zone, with the aid of a slowly evaporating organic solvent and that the absorbed $NH_3$ is recovered upon solvent regeneration. Various alkylene glycol solvents have been suggested but in view of operational problems and related efficiency setbacks, said process has never achieved a breakthrough on the market for over 30 years. Patent WO 90/08736 A1 describes a further process of this type but on account of poor efficiency of this system in $NH_3$ synthesis plants operated at a loop pressure of >100 bar, this process also failed on the market. A further process is outlined in DD 135 372 which provides for scrubbing to remove $NH_3$ from off-gas or desorption gas with the aid of organic liquids such as ethylene glycol, di- or triethylene glycol or their mono- or dimethyl ether or mixtures thereof which may also contain up to 20% of water.

Hence, the aim of the invention is to overcome the said disadvantage and to provide a very efficient process suited to separate $NH_3$ and $CH_4$ from the synthesis gas irrespective of the operating pressure level.

SUMMARY OFTHE INVENTION

The aim of the invention is achieved as follows: a high-boiling, physically acting and regenerable solvent which contains homologues of alkylene glycol-alkyl-ether and which also may contain water and that is suited to absorb the components $NH_3$, $H_2$, $N_2$ and $CH_4$ from the synthesis gas and to remove said components from the laden solvent in at least two further process steps at different pressure rates, thereby withdrawing at least one $NH_3$-rich and at least one $CH_4$-rich gas fraction from the solvent. This method is applied to regenerate the solvent. In this context the term "high-boiling" is understood to mean a solvent the vapour pressure of which is sufficiently low to preclude any contamination of the pressure gas under the selected process parameters. The solvent is regarded to be physically acting if it does not form any chemical compound with the $NH_3$. And it is regarded as regenerable if the solvent and $NH_3$ constitute a wide-boiling binary system.

As the solvent is regenerable, it is feasible and efficient to design the absorption process as a closed cycle. Compared to other solvents, such as glycols, the homologues of alkylene glycol-alkyl-ether have the advantage that they are very inert to reaction and, hence, they react neither with the substances to be separated nor with other components of the synthesis gas. Moreover, they have a very low viscosity which on the one hand improves the mass transfer in the absorption and on the other hand helps to save pump energy.

The process described is particularly suited for the separation of $NH_3$ and $CH_4$ in ammonia production plants because it permits in a single absorption step to withdraw from the synthesis gas almost completely the product obtained and the $CH_4$ normally enriched in the synthesis loop. In comparison to the conventional state of the art, the process has a major advantage, i.e. the operating pressure remains unchanged whereas the partial pressure of the feedstocks are raised, which improves the yield and allows a lower purge stream rate, thus saving plant and operating costs.

The absorption process takes place in the temperature range from −30° C. to +50° C., each temperature selected necessitating a suitable solvent from the group of homologues of alkylene glycol-alkyl-ether and water being admixed to said solvent. The temperature range referred for this absorption is 0° C. up to +40° C., which especially applies to cases in which the process described in this invention is used in plants for $NH_3$ production.

The absorption step may either be part of a conventional scrubbing in which the liquid solvent comes directly into contact with the synthesis gas, but it may also take place in devices in which said solvent does not directly come into contact with the synthesis gas. In a further embodiment of the invention the absorption step takes place in a contactor equipped with a diaphragm suitable to partition the gas side from the liquid side and permeable to the gas components but impermeable to the solvent, so that the solvent does not come into direct contact with the synthesis gas. This method has a special advantage because it definitely prevents the penetration of solvent into the synthesis gas so that the steam pressure required for the solvent decreases accordingly vis-à-vis that needed for scrubbing, thereby improving the viscosity and the solubility in $NH_3$ and $CH_4$ of the solvent. An additional advantage of this method is that the diaphragm has a substantially larger contact surface with regard to volume than that provided for processes with direct contact of solvent and synthesis gas. It is recommended that the diaphragm be arranged in one or several contactors of modular type and be designed as capillary components conveying the solvent. In comparison to the solvents known to be used for diaphragm contactors according to, for example, EP 0 751 815 B1 the homologues of alkylene glycol-alkyl-ether exhibit a major advantage of lower viscosity, a fact that really permits cost-effective conveyance through capillary components and this constitutes an advantage of the invention.

A further embodiment of the invention provides for solvent regeneration in at least three process steps. When implementing this configuration in a plant for $NH_3$ production from synthesis gas it is recommended that the solvent first passes through the arrangement of at least three process steps designed to reduce the operating pressure and, optionally, increase the operating temperature of the solvent so that the dissolved gases are removed, said steps being called flashing steps. The solvent then flows through a downstream rectification step and a regeneration step operated at atmospheric or negative pressure. The first flashing step is used to reduce the pressure of the laden solvent to a value that permits evaporation of $H_2$-rich gas from the solvent. The second step provides for flashing to a pressure that is suited for the development of $CH_4$-rich gas and the third step for a further pressure reduction permitting the development of $NH_3$ vapour. This configuration enables the generation of three gas streams which represent and advantage of the invention. The $H_2$-rich gas stream, for example, can be recycled to the $NH_3$ synthesis system or exploited as heating agent and the $CH_4$-rich stream, for example, is suitable for recycling to the plant for generation of $NH_3$ synthesis gas or exploitable for heating.

Further generation of the solvent or of a part-stream thereof is effected by thermal regeneration implemented as rectification, preferably in two steps: first at a pressure above the atmospheric pressure so that the vapours from the column are condensable by an economic method and subsequently below the atmospheric pressure or partial vacuum. This can be turned to an advantage by compressing the vapours to such an extent that it becomes condensable together with the vapours from the upstream regeneration steps. The last regeneration step carried out under partial vacuum alternatively can be implemented as flashing step. A further embodiment of the invention provides for the feed of the desorbed $NH_3$ vapour to the intake side of a coolant compressor. The liquid $NH_3$ obtained in the coolant compressor is exploited as reflux for the upstream rectification step.

When supplying larger amounts of heat to the flashing steps it is possible to increase the quantity of $NH_3$ evaporated from the solvent. In this case it is an advantage to re-use low-temperature heat, particularly waste heat from other process steps. It is also possible to implement the flashing steps in a split mode, i.e. decreasing the pressure in a first individual step and raising the temperature in a second.

In a further embodiment of the invention the compressed $NH_3$ vapour is scrubbed with the aid of liquid $NH_3$ from a refrigeration system and is subsequently recycled to a cold flashing step, so that solvent losses are avoided. Said refrigeration unit can be beneficially integrated into the regeneration process.

A further embodiment of the invention provides for a regeneration of the solvent using inert gas. The stripping agent required can be flash gas withdrawn from the process itself or heating gas taken from synthesis gas loop or steam generation unit upstream of the $NH_3$ synthesis process.

DESCRIPTION OF THE PREFERRED EMBODIMENT

Figure 1:
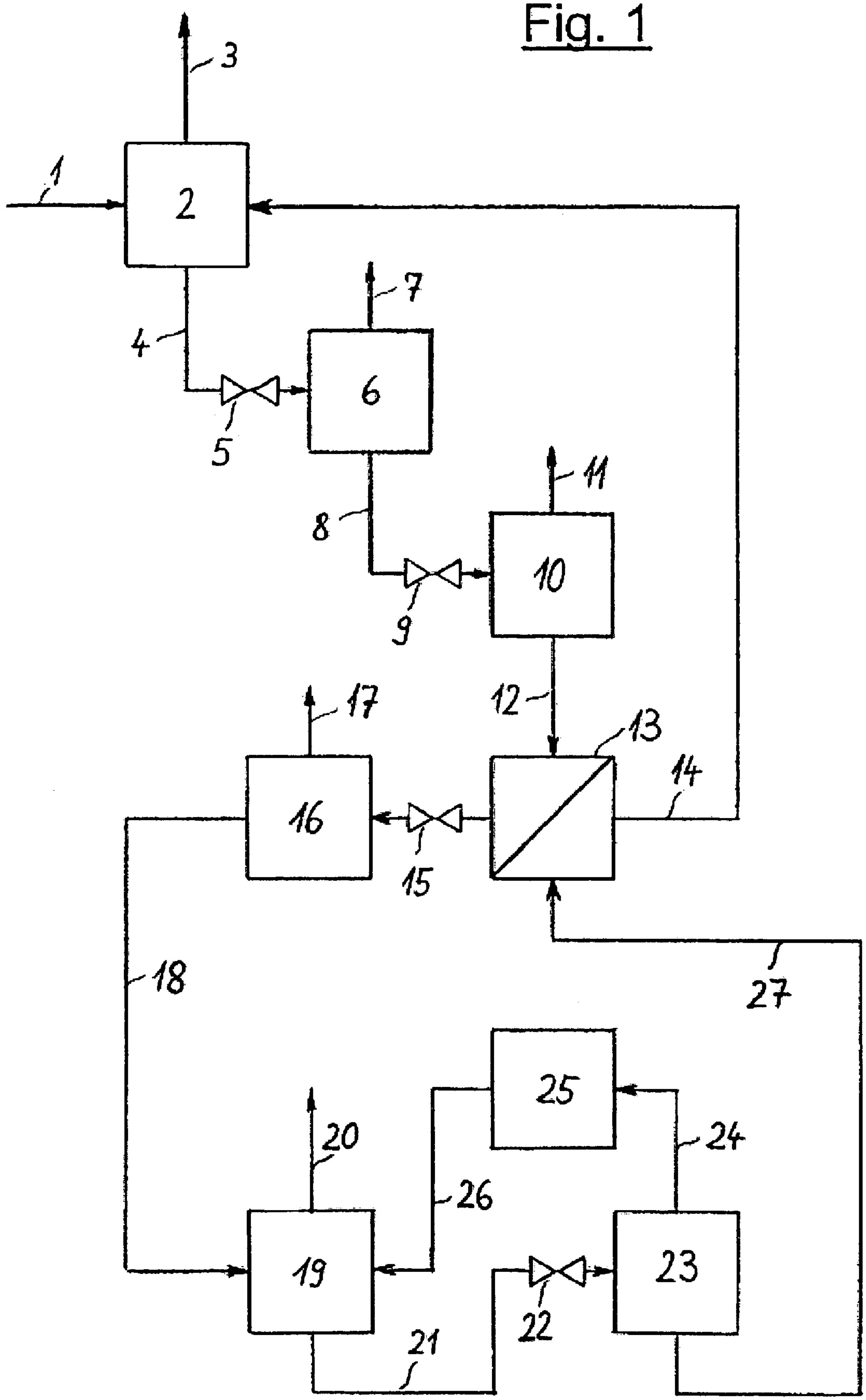
FIG. 1 is a flow diagram for the absorptive separation of $NH_3$ and $CH_4$ from a gas under pressure which contains at least $NH_3$, $H_2$, $N_2$ and $CH_4$.

The invention is illustrated in the three PFDs which show a typical configuration. FIG. 1 depicts the invented process which includes an absorption step, several pressure reducing units and a regeneration system for the solvent in a multi-stage desorption. It is possible to provide various locations for $NH_3$ absorption in the $NH_3$ production process and, optionally, several absorption devices may be arranged in a single plant section. The representation of just one absorption step is shown in FIG. 1 and FIG. 2, hence, is to be understood that several absorption steps may exist and that the regeneration of solvent and the $NH_3$ recovery described in this document may also be combined for all absorption steps.

$NH_3$-rich synthesis gas 1 is fed at a pressure of approx. 180 bar (abs.) to absorption step 2 in which $NH_3$ is absorbed by a solvent. $NH_3$-lean synthesis gas 3 is withdrawn from absorption step 2 and piped to a downstream unit not represented in the diagram. Laden solvent 4 is reduced to a pressure of 60 bar (abs.) in pressure reducing station 5 and then sent to $H_2$ degassing step 6 in which $H_2$-rich non-reacted gas 7 separates from the solvent. Said off-gas 7 may either be admixed to the synthesis gas or be used for heating. Laden solvent 8 undergoes a further pressure reduction to 12 bar (abs.) in pressure reducing station 9 and conveyed to $CH_4$ degassing station 10 in which $CH_4$-rich off-gas 11 separates from the solvent. Said off-gas 11 may either be admixed to the feed gas used for a reforming process to produce synthesis gas or be exploited for heating. Laden solvent 12 is heated in heat transfer station 13 with the aid of regenerated solvent 14 and undergoes pressure reduction to 10 bar (abs.) in pressure reducing station 15 in order to be fed to $NH_3$ degassing station 16, thus obtaining $NH_3$-rich off-gas 17 from the solvent and exploiting this gas for $NH_3$ recovery.

Solvent 18 that is still laden with $NH_3$ is fed to pressure desorption step 19 which, for example, may be designed as rectification column and supplies desorbed $NH_3$ condensate 20 as overhead product. Partly regenerated solvent 21 obtained as bottom product undergoes pressure reduction to 1 bar (abs.) in pressure reducing station 22 and is piped to low-pressure desorption step 23 which may also be designed as rectification column. The $NH_3$ obtained by this method is recycled to said step 23 via $NH_3$ vapour recycle line 24, compression unit 25 and $NH_3$ recycle line 26. An extremely beneficial equipment design for this application is to send the vapours from the rectification column, which serves as low-pressure desorption step, directly to the intake side of a coolant compressor and to use the liquid $NH_3$ thus obtained for reflux so that the functions of compression unit 25 and of cooling the overhead product from low-pressure desorption step 23 are implemented simultaneously. The heat contained in regenerated solvent 27 is exploited in heat transfer station 13 and said solvent 14 is then re-used in absorption step 2.

Figure 2:
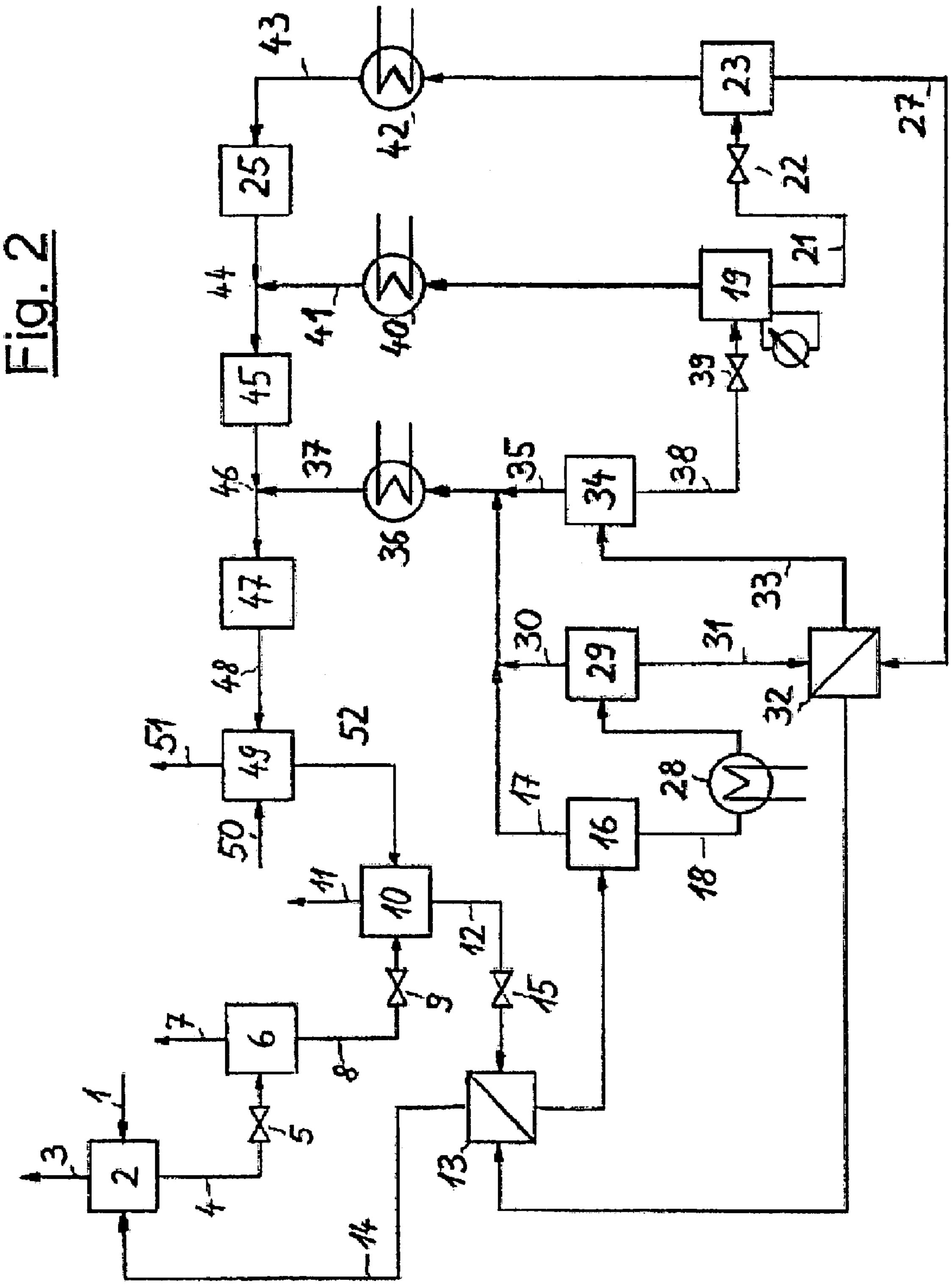
FIG. 2 is a flow diagram as depicted in FIG. 1 with further $NH_3$ degassing stations, solvent recovery from the gaseous $NH_3$ and a decoupling facility of solvent regeneration.

FIG. 2 illustrates further embodiments of the invention, compared to FIG. 1, in particular with further $NH_3$ degassing stations, solvent recovery from the gaseous $NH_3$ and decoupling facility of solvent regeneration. The nomenclature of reference numbers 1 to 17 are applicable to FIG. 2 by analogy to FIG. 1, the only difference being pressure reducing station 15 arranged upstream of heat transfer station 13. This configuration facilitates an incorporation of both steps into one equipment unit; the specialist skilled in the art will select the most beneficial version in each case.

Laden solvent 18 is heated in heating device 28 which preferably uses waste heat from other process steps. This entails a shift of the solution equilibrium and, hence, further $NH_3$-rich gas is liberated in $NH_3$ degassing station 29. This gas should be mixed with $NH_3$-rich gas 17. Laden solvent 31 can be further heated in heat transfer station 32 using regenerated solvent 27 so that the solution equilibrium is further shifted which causes liberation of further $NH_3$ in downstream $NH_3$ degassing station 34. $NH_3$-rich gas 35 thus obtained may also be mixed with $NH_3$-rich gas 17 and/or 30. When considering the overall configuration this is a multi-stage heat shifting system from the regenerated solvent to the laden solvent, including additional heat supply, the adequate arrangement of such heat supply station being selectable depending in each case on the local conditions and in particular on the available sources of heat.

The $NH_3$-rich gas obtained from degassing stations 16, 29 and 34 and from admixing stations 17, 30 and 35 is cooled to the $NH_3$ dew point in cooling station 36 prior to the gas compression. Apart from $NH_3$, $NH_3$ vapour 37 also contains small portions of $CH_4$, $H_2$ and evaporated solvent.

Laden solvent 38 is piped from $NH_3$ degassing station 34 and, if necessary, via a further pressure reducing station 39 to pressure desorption step 19 which is shown as a mere stripping column in the flow diagram (FIG. 2). Vaporous $NH_3$ is obtained but it contains impurities, chiefly solvent portions. Partly regenerated solvent 21 is withdrawn from the bottom, sent to pressure reducing station 22 to be further degassed and then fed to low-pressure desorption step 23 in which the residual $NH_3$ is removed from the solvent as $NH_3$vapour 41. Regenerated solvent 27 is now recycled via the two heat transfer stations 32 and 13 to absorption step 2 so that this completes the solvent cycle.

Contrary to the example shown in FIG. 1, the $NH_3$ vapours separated in the two desorption steps 19 and 23 as shown in the example in FIG. 2 as well as small portions of the $NH_3$-rich gas separated in degassing stations 16, 29 and 34 yet contain some solvent which cannot be tolerated in the final product and hence must be removed. According to the invention this requirement is met when $NH_3$ vapours 43, 41 and 37 are combined downstream of cooling stations 42, 40 and 36 as well as the subsequent compression units 25 and 45, thus forming the respective admixtures 44 and 46. In this context it is recommendable to provide a further compression station 47 to adjust the pressure such that it is easy to liquefy $NH_3$ vapour 48 at temperatures that need not be very low. The impurities contained in the solvent are removed in post-scrubber 49 which uses liquid $NH_3$ 50 as scrubbing liquid. Purified $NH_3$ vapour 51 leaves the scrubber at the top, which may be designed as column with few trays, and said vapour can directly be used for further processing or sent to a refrigeration unit for the production of liquid $NH_3$. The liquid $NH_3$/solvent mixture 52 obtained in post-scrubber 49 is either sent to $CH_4$ degassing station 10 or mixed with laden solvent 12 so that it is recycled to the solvent loop, thereby reducing the solvent losses. A further advantage is that the pressure constancy of the regeneration system is improved.

Figure 3:
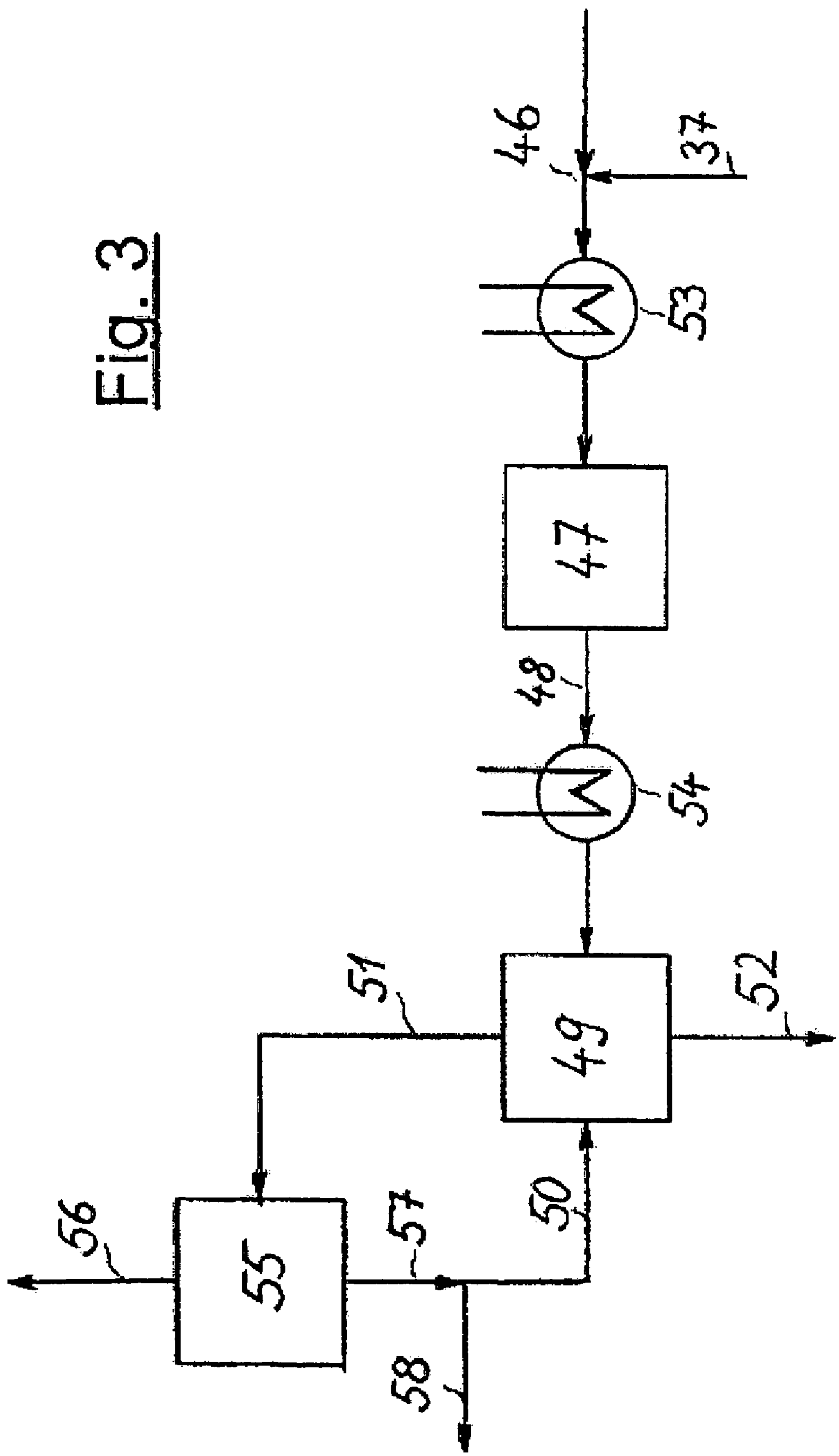
FIG. 3 is a flow diagram of a process in accordance with the invention as depicted in FIG. 2 wherein liquid $NH_3$ vapour is produced in a condensation unit tied into the system.

FIG. 3 shows an embodiment of the process in accordance with the invention and constitutes a supplement to FIG. 2. In this case, liquid $NH_3$ which is used to remove the solvent from the laden $NH_3$ vapour is produced in a condensation unit tied into the system.

Prior to being compressed in station 47, the $NH_3$ vapour obtained downstream of admixing station 46 is cooled in station 53 to an extent that bears no risk for the compressor and the compressed $NH_3$ vapour is further cooled in cooling station 54 so as to reach the $NH_3$ dew point which, however, must not be exceeded. Subsequent scrubbing takes place in post-scrubber 49 in accordance with the example shown in FIG. 2 but $NH_3$ vapour 51 is piped to $NH_3$ condenser 55 in which $NH_3$ almost completely condenses. Minor portions of uncondensable gases, chiefly $CH_4$, are withdrawn as $CH_4$-rich off-gas 56. The condensed liquid $NH_3$ 57 is mainly drawn off as liquid $NH_3$ product 58, but the remaining portion of liquid $NH_3$ 50 is exploited as scrubbing liquid in post-scrubber 49.

| Key to diagrams: |
|---|
| 1 $NH_3$-rich synthesis gas |
| 2 Absorption step |
| 3 $NH_3$ lean synthesis gas |
| 4 Laden solvent |
| 5 Pressure reducing station |
| 6 $H_2$ degassing step |
| 7 $H_2$-rich off-gas |
| 8 Laden solvent |
| 9 Pressure reducing station |
| 10 $CH_4$ degassing station |
| 11 $CH_4$-rich off-gas |
| 12 Laden solvent |
| 13 Heat transfer station |
| 14 Regenerated solvent |
| 15 Pressure reducing station |
| 16 $NH_3$ degassing station |
| 17 $NH_3$-rich off-gas |
| 18 Laden solvent |
| 19 Pressure desorption step |
| 20 $NH_3$ condensate |
| 21 Partly regenerated solvent |
| 22 Pressure reducing station |
| 23 Low-pressure desorption step |
| 24 $NH_3$ vapour recycle line |
| 25 Compression unit |
| 26 $NH_3$ recycle line |
| 27 Regenerated solvent |
| 28 Heating device |
| 29 $NH_3$ degassing station |
| 30 $NH_3$-rich gas |
| 31 Laden solvent |
| 32 Heat transfer station |
| 33 Laden solvent |
| 34 $NH_3$ degassing station |
| 35 $NH_3$-rich gas |
| 36 Cooling station |
| 37 $NH_3$ vapour |
| 38 Laden solvent |
| 39 Pressure reducing station |
| 40 Cooling station |
| 41 $NH_3$ vapour |
| 42 Cooling station |
| 43 $NH_3$ vapour |
| 44 Admixing station |
| 45 Compression unit |
| 46 Admixing station |
| 47 Compression station |

-continued

| Key to diagrams: |
|---|
| 48 $NH_3$ vapour |
| 49 Post-scrubber |
| 50 Liquid $NH_3$ |
| 51 $NH_3$ vapour |
| 52 $NH_3$/solvent mixture |
| 53 Cooling station |
| 54 Cooling station |
| 55 $NH_3$ condenser |
| 56 $CH_4$-rich off-gas |
| 57 Liquid $NH_3$ |
| 58 Liquid $NH_3$ product |

What is claimed is:

1. A process for the absorptive separation of $NH_3$ and $CH_4$ from a gas under high pressure, which at least contains $NH_3$, $H_2$, $N_2$ and $CH_4$, wherein the absorbed components $NH_3$, $H_2$, $N_2$ and $CH_4$ are separated from the laden solvent in at least two further regeneration process steps at different pressure rates using a high-boiling, physically acting and regenerable solvent which contains homologues of alkylene glycol-alkyl-ether and which also may contain water, thereby withdrawing at least one $NH_3$-rich and at least one $CH_4$-rich gas fraction from the solvent.

2. Use of the process according to claim 1 in an ammonia production plant.

3. A process according to claim 1, wherein the absorption process takes place in the temperature range from −30° C. to +50° C., preferably in the range from 0° C. up to +40° C.

4. A process according to claim 1, wherein the absorption takes place in at least one contactor or in contactor modules, the solvent being hindered to come into direct contact with the gas, which at least contains $NH_3$, $H_2$, $N_2$ and $CH_4$, by a diaphragm arranged in between and permeable to the gas components but impermeable to the solvent.

5. A process according to claim 1, wherein the regeneration primarily takes place in at least two process steps designed to reduce the operating pressure and, optionally, increase the operating temperature of the solvent so that the dissolved gases are removed, the solvent then flowing through a downstream rectification step and then through a downstream regeneration step operated at a pressure that does not exceed the atmospheric pressure.

6. A process according to claim 1, wherein the regeneration primarily takes place in at least three process steps designed to reduce the operating pressure and, optionally, increase the operating temperature of the solvent so that the dissolved gases are removed, the solvent then flowing through a downstream rectification step and then through a regeneration step operated at a pressure that does not exceed the atmospheric pressure.

7. A process according to claim 1, wherein a $H_2$-rich gas is obtained in the first regeneration step.

8. A process according to claim 7, wherein the $H_2$-rich gas obtained is re-used as $NH_3$ synthesis gas.

9. A process according to claim 1, wherein a $CH_4$-rich gas is obtained in the first or second regeneration step.

10. A process according to claim 9, wherein the $CH_4$-rich gas obtained is re-used as feed gas for the production of $NH_3$ synthesis gas.

11. A process according to claim 7, wherein the $H_2$-rich and/or $CH_4$-rich gas obtained is exploited as a heating agent.

12. A process according to claim 6, wherein $NH_3$-rich gas is obtained from the third regeneration step.

13. A process according to claim 6, wherein waste heat is exploited for regeneration.

14. A process according to claim 6, wherein the vapors of the last regeneration step are compressed so that they become condensable together with the vapors of the upstream regeneration step.

15. A process according to claim 14, wherein the vapors of the last regeneration step are fed to the intake side of a coolant compressor.

16. A process according to claim 1, wherein $NH_3$ gases and vapors obtained during the regeneration of the solvent are cooled and compressed.

17. A process according to claim 16, wherein compressed $NH_3$ gases and vapors are scrubbed with the aid of cold, liquid $NH_3$, thus removing any solvent residues and the $NH_3$/solvent mixture obtained being recycled to one of the upstream process steps.

18. A process according to claim 10, wherein the regeneration of the solvent is obtained or supported by stripping using inert gas.

* * * * *